United States Patent

O'Grady et al.

[11] Patent Number: 5,402,184
[45] Date of Patent: Mar. 28, 1995

[54] PROJECTION SYSTEM HAVING IMAGE OSCILLATION

[75] Inventors: William J. O'Grady, Yonkers; William F. Guerinot, Yorktown Hgts., both of N.Y.

[73] Assignee: North American Philips Corporation, New York, N.Y.

[21] Appl. No.: 25,293

[22] Filed: Mar. 2, 1993

[51] Int. Cl.$^6$ .......................... H04N 5/74; H04N 9/31
[52] U.S. Cl. ........................ 348/764; 348/771
[58] Field of Search ............... 358/231, 236, 60, 61, 358/62, 63; H04N 5/74, 9/31; 348/744, 745, 749, 759, 761, 766, 768, 763, 770, 771, 764

[56] References Cited

U.S. PATENT DOCUMENTS

| | | | |
|---|---|---|---|
| 4,827,334 | 5/1989 | Johnson et al. | 348/745 |
| 5,032,924 | 7/1991 | Brown | 358/231 |
| 5,105,265 | 4/1992 | Sato et al. | 358/61 |

FOREIGN PATENT DOCUMENTS

| | | | |
|---|---|---|---|
| 364043 | 4/1990 | European Pat. Off. | H04N 9/31 |
| 0492661 | 7/1992 | European Pat. Off. | H04N 9/31 |
| 492721 | 7/1992 | European Pat. Off. | H04N 9/31 |
| 0509630 | 10/1992 | European Pat. Off. | H04N 9/31 |
| 132476 | 7/1985 | Japan | 358/231 |
| 63-292880 | 11/1988 | Japan | H04N 5/74 |
| 62-292880 | 11/1988 | Japan | H04N 7/54 |
| 1-47180 | 2/1989 | Japan | H04N 5/74 |
| 64-47180 | 2/1989 | Japan | H04N 5/74 |
| 62203543 | 2/1989 | Japan | H04N 5/74 |
| 1341495 | 12/1989 | Japan | G03B 21/00 |
| 6437567 | 8/1990 | Japan | G09F 9/00 |
| 2250081 | 10/1990 | Japan | G09F 9/00 |
| 2142203 | 1/1985 | United Kingdom | 358/60 |

*Primary Examiner*—James J. Groody
*Assistant Examiner*—Chris Grant
*Attorney, Agent, or Firm*—John C. Fox

[57] ABSTRACT

A video projection system using a light modulating display device having a row and column matrix of picture elements is improved by imparting an oscillatory motion to the display image in the plane of the image, to thereby reduce the visibility of the individual picture elements of the matrix. The resolution of the image can be increased by displaying different video information at different parts of the oscillatory cycle.

7 Claims, 6 Drawing Sheets

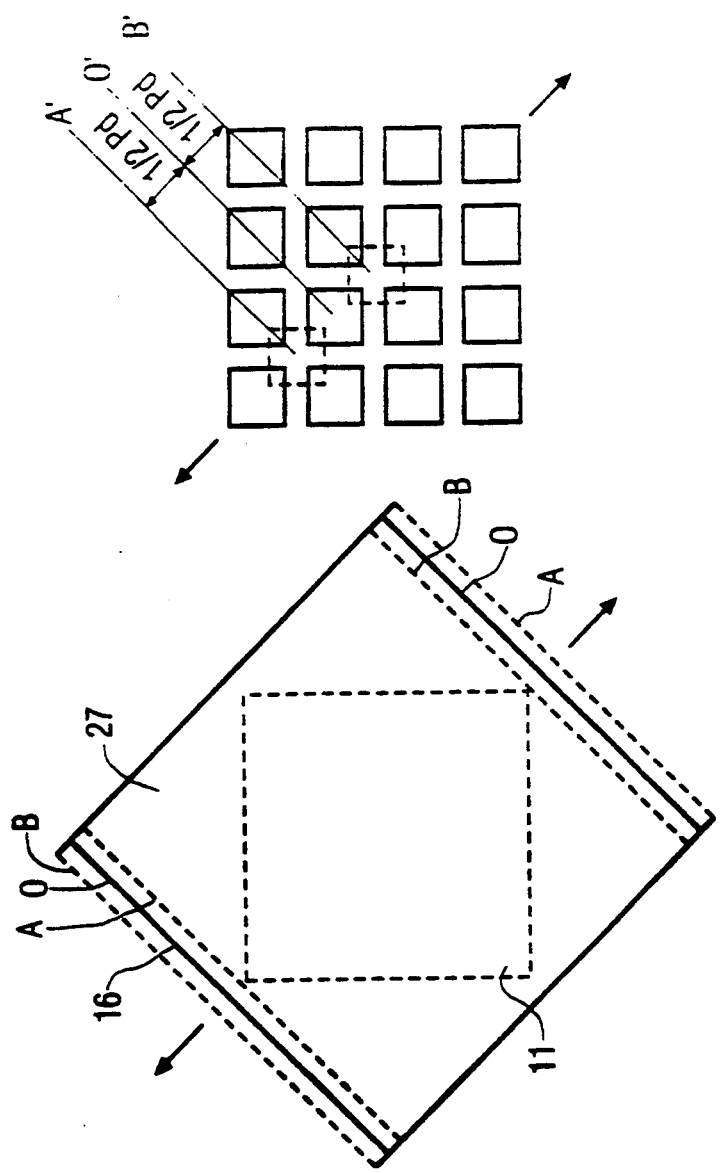
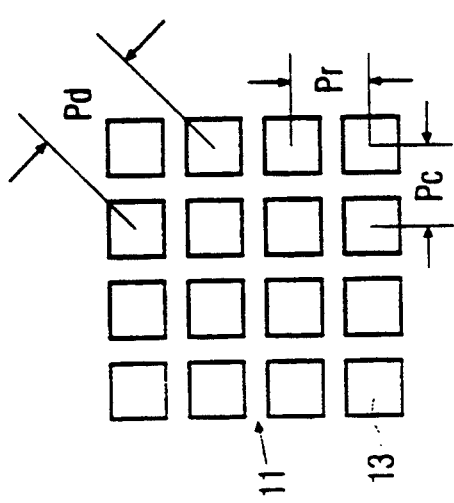
FIG. 2(c)
FIG. 2(b)
FIG. 2(a)

PROJECTION SYSTEM HAVING IMAGE OSCILLATION

BACKGROUND OF THE INVENTION

This invention relates to projection display systems, and more particularly relates to such systems incorporating at least one display device having a row and column matrix of individual display elements capable of displaying picture information by modulating incident illumination in response to a display signal.

Projection systems such as video projection systems employing light modulating matrix display devices such as liquid crystal displays (LCDs) and digital micromirrored devices (DMDs) produce images having perceptible rows and columns of pixels, which are aesthetically objectionable and limit resolution.

OBJECTS AND SUMMARY OF THE INVENTION

Accordingly, an object of the invention is to provide a projection system employing a matrix display device in which the individual pixel structure is less apparent in the projected image.

Another object of the invention is to provide such a projection system having increased resolution.

According to the invention, there is provided a projection display system employing at least one matrix display device modulating incident illumination in response to a display signal, in which the projected image is caused to oscillate in the image plane, whereby the perception of the individual pixels in the matrix is reduced.

When the information state of the pixels remains unchanged during one cycle of oscillation, the amplitude of the oscillation is preferably limited to one half of the pitch, where the pitch is defined as the center-to-center distance between immediately adjacent pixels, in order to avoid the perception of an overlap or smearing of adjacent pixels into one another.

The frequency of the oscillation is preferably sufficient to avoid a perception of motion of the pixels on the screen. For example, where the display signal is a frame-by-frame display signal such as a video display signal, where each new frame may contain display information differing from that of the previous frame, the frequency of oscillation is preferably at least equal to the frame frequency of the signal.

The oscillation of the display image may be achieved by imparting oscillatory motion, in a direction transverse to the optical path of the display device itself or of any of the optical elements in the system. The path of the oscillation on the display screen may be linear, for example, in the direction of the rows or the columns or diagonal thereto, or may be circular, elliptical or any other path.

An oscillatory motion of the display device or the optical elements may be imparted by any suitable mechanical oscillator, such as a piezoelectric stack, an electromagnetic actuator, or a motor with an unbalanced weight on the shaft. A circular path could be achieved by mounting a lens element off center on a wheel rotating in the optical path, or by mounting an optical plate at an angle to the optical path and rotating the plate about the optical path.

In a preferred embodiment of the invention, the display device operates in the reflective mode and is illuminated by a prism illuminator, which is a composite optical element comprised of a pair of prisms separated by an air gap. According to this embodiment, oscillation of the projected image is achieved by imparting oscillatory motion to one of the prisms, to result in an oscillatory change in the width of the air gap. The amplitude of the image oscillation is proportional to the amplitude of the gap oscillation.

BRIEF DESCRIPTION OF THE DRAWING

FIG. 2(a) is a schematic diagram of a matrix of reflective picture elements of a display device of the type shown in FIG. 1;

FIG. 2(b) is a schematic diagram showing the relationship between the display device of FIGS. 1 and 2(a) and a prism illuminator rotated 45 degrees about the optical path from the position shown in FIG. 1;

FIG. 2(c) is a schematic diagram showing a pixel image of the matrix of FIG. 2(a) on a display screen, showing the extreme oscillatory positions for one of the pixels resulting from the arrangement of FIG. 2(b);

DESCRIPTION OF THE PREFERRED EMBODIMENTS

Figure 1:
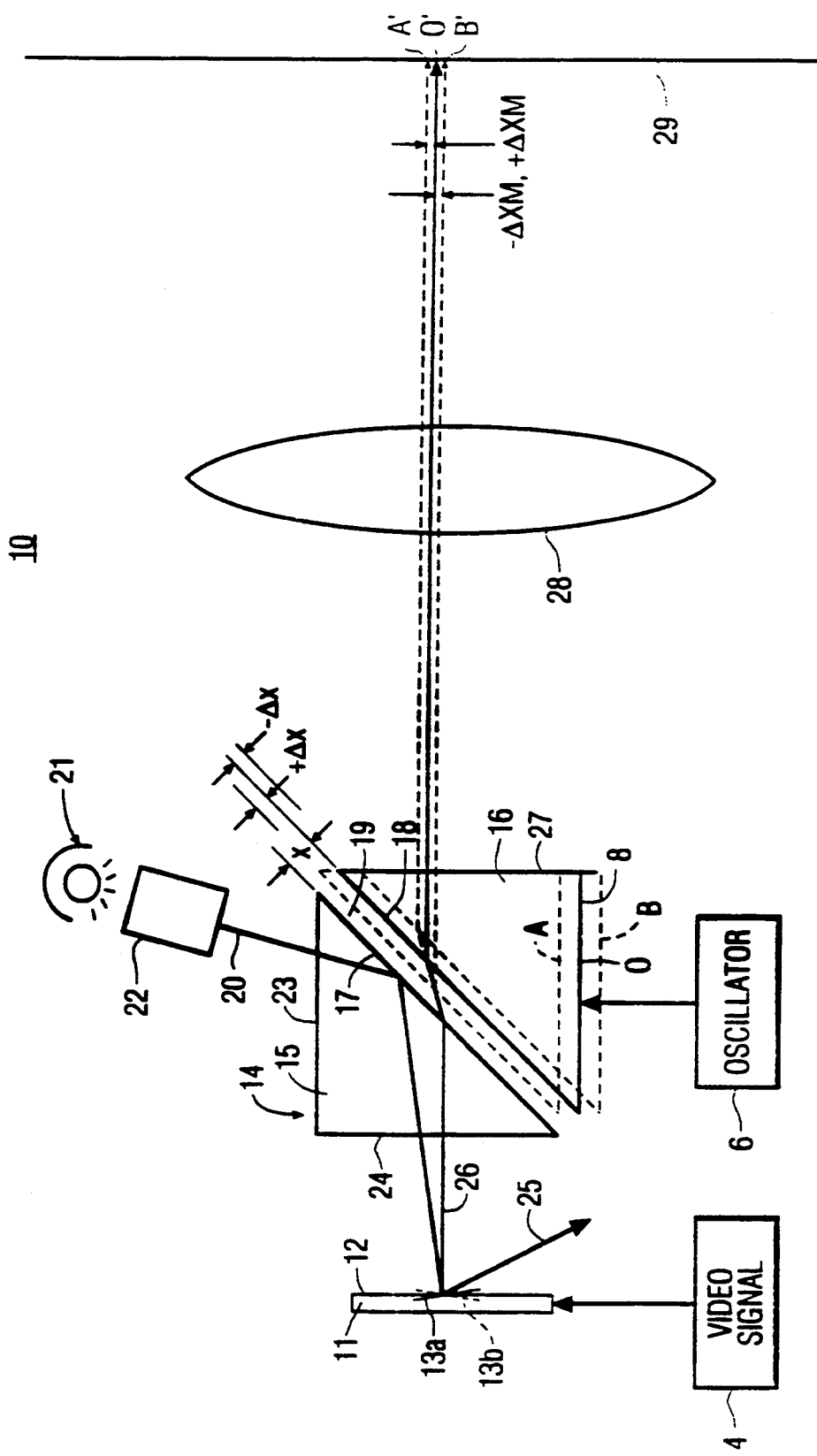
FIG. 1 is a schematic diagram showing a side view of one embodiment of a projection system of the invention, including a display device, a prism illuminator for the display device, and an oscillator for the prism illuminator.

FIG. 1 illustrates schematically one of the preferred embodiments of the invention. Projection display system 10 includes a display device 11 operating in the reflective mode, the device known as a digital micromirror device or DMD. The DMD is a solid state device fabricated from a single piece of silicon, and comprising a matrix array of deformable mirror elements, each of which can be made to tilt in response to an applied voltage, and thus to direct reflected light into or out of an optical projection system. Using a matrix of electrodes arranged in rows and columns, the individual mirror elements can be made to tilt "on" or "off" in response to a video signal, to thereby recreate the video image for projection. See, for example, U.S. Pat. Nos. 4,638,309; 4,680,579; and 5,097,544.

Referring again to FIG. 1, DMD 11 has a reflective surface 12 consisting of a matrix array of mirror elements, one of which is shown schematically in the "on" position 13a, and (in phantom) in the "off" position 13b. Reflective surface 12 is illuminated by a composite optical element 14 termed herein a "prism illuminator". Prism illuminator 14 includes a pair of prisms 15 and 16 having their long sides 17 and 18 separated by an air gap 19. In operation, illumination beam 20, from source 21 and beam-forming optics 22, enters prism illuminator 14 via input face 23, is totally internally reflected at 17 toward output face 24, where it exits prism illuminator 14 to illuminate reflective face 12 of DMD 11. Light reflected by the "off" elements of the matrix, represented by beam 25, is discarded, while light reflected by the "on" elements, represented by beam 26, re-enters prism illuminator 14 at 24, traverses gap 19, exits at output face 27, passes through projection lens 28 and lands on projection screen 29. The elements are turned "on" or "off" in accordance with signals from video source 4. In accordance with the invention, an oscillator 6, for example, a piezoelectric stack, or a linear actuator using the voice coil principle, imparts an oscillatory motion to prism 16, causing the width of air gap 19 to change in response thereto.

The mean position of the prism 16 during oscillation is represented by the solid line O, while the extreme positions are represented by the dashed lines A and B. These extreme positions are the result of a change in width x of plus and minus delta x of the air gap 19. This change in width of air gap 19 in turn causes a deviation in the path of beam 26 as it traverses the gap, resulting in corresponding mean and extreme landing positions on screen 29 of O', A' and B', respectively, with the amount of displacement of points A' and B' from O' being proportional to the change in width x, with maximum displacement designated as plus or minus M delta x, where M is a proportionality constant. Of course, prism 16 could be moved in a direction normal to sides 17 and 18, so that delta x would be equal to the displacement of prism 16 by the oscillator.

The direction of displacement of the pixels is determined by the orientation of the prism illuminator with respect to the DMD. In FIG. 1, the side 8 of the prism 16, to which oscillations are imparted by oscillator 6, is located in a horizontal plane, normal to the plane of the drawing, and the direction of displacement is normal to this horizontal plane. This displacement results in a vertical displacement of the pixels on the projection screen.

The pixels could also be displaced horizontally, by rotating the prism illuminator 14 (and source 21 and beam focusing optics 22) about the optical path until side 8 is oriented in a vertical plane, parallel to the plane of the drawing. In the case of either vertical or horizontal displacement, the light along the respective column or row of the matrix will not be interrupted. Alternatively, the pixels could be displaced diagonally, to fill spaces between the rows and columns alike. FIGS. 2(a) through (c) illustrate this situation. FIG. 2(a) shows a matrix array of picture elements 13 of DMD 11. The distance between the centers of adjacent elements is designated the pitch, with the pitch of elements in adjacent columns being Pc, in adjacent rows being Pr, and in adjacent diagonals being Pd.

For a diagonal displacement, the prism illuminator 14 has been rotated 45 degrees about the optical path, to result in the orientation shown in FIG. 2(b), a view of the DMD 11 and output face 27 of prism illuminator 14 along the optical path from the position of the projection screen. The mean position of prism 16 during oscillation is indicated by solid line O for output face 27, while the extreme positions are indicated by the dashed lines A and B, respectively. The direction of displacement is shown by the arrows.

The effect of this displacement on the pixel image at the projection screen is shown in FIG. 2(c). The mean positions of the pixels is indicated by the solid lines, while positions of one of the pixels on each side of the mean position are indicated by the dashed lines, with the centers of these positions being indicated as O', A' and B', respectively, and the amplitude of the oscillations of the pixels being equal to one half Pd.

Figure 3:
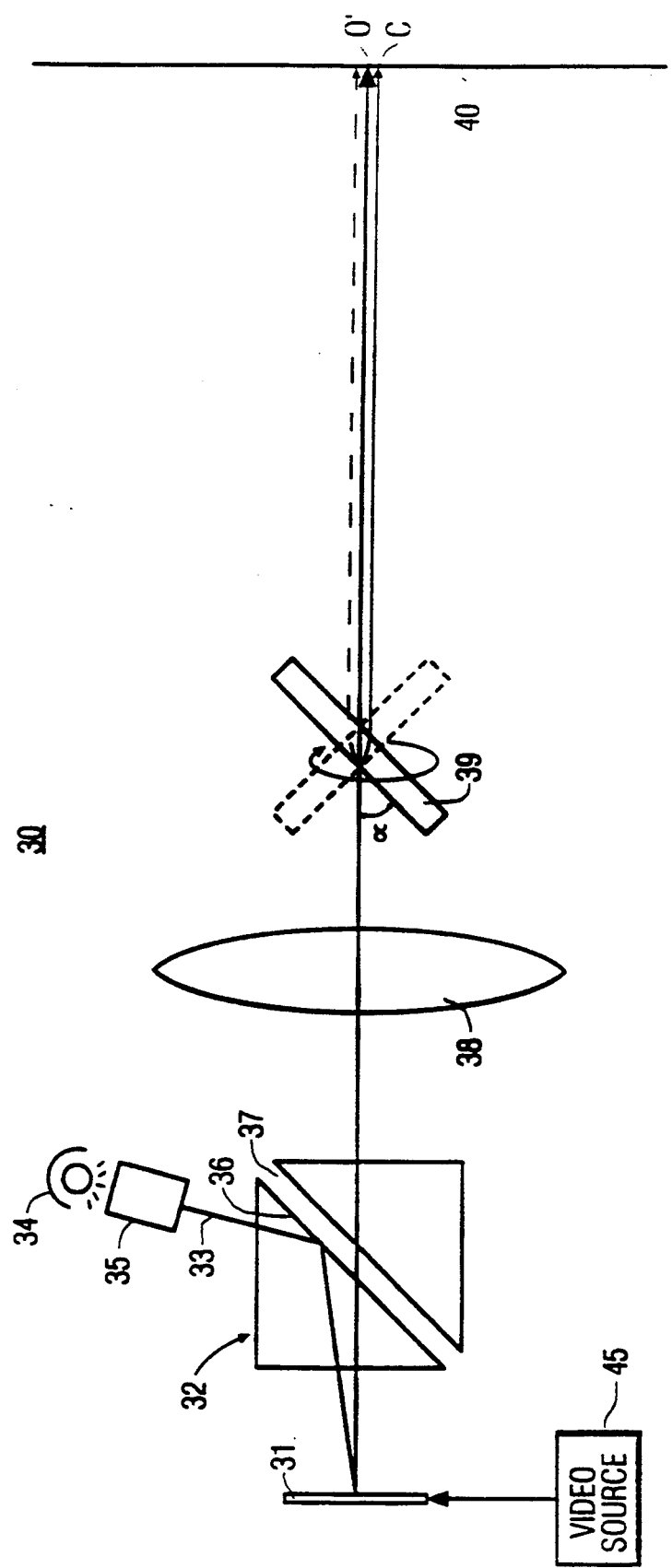
FIG. 3 is a schematic diagram of another embodiment of a projection system of the invention, including an angularly oriented rotating optical plate.

FIG. 3 illustrates another embodiment of the projection system of the invention, in which DMD 31 is illuminated by prism illuminator 32, which directs illumination beam 33 from source 34 and beam-forming optics 35, via total internal reflection to DMD 31. The beam is reflected back by DMD 31, through air gap 37, projection lens 38, to projection screen 40. Inserted into the optical path between lens 38 and screen 40 is an optical plate 39, oriented to have its optical surfaces at an angle alpha to the optical path, and to be rotatable about the optical path.

Figure 4:
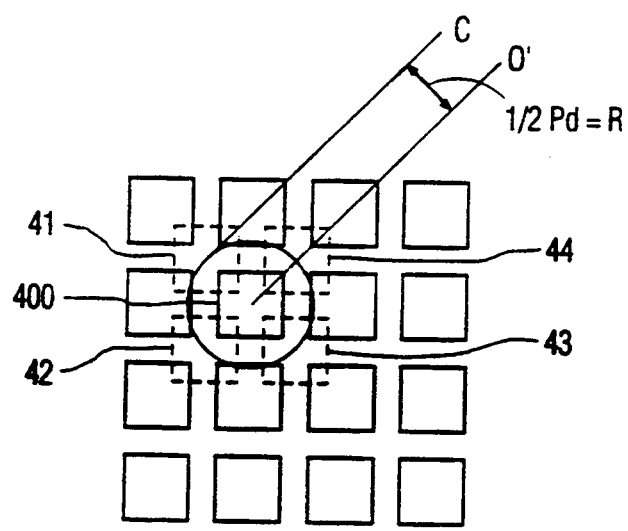
FIG. 4 is a schematic diagram of a pixel image on a display screen, showing the circular path for one of the pixels resulting from the arrangement of FIG. 3.

As shown in FIG. 4, upon rotation of plate 39, this arrangement causes the individual pixel images at the screen 40 to follow a circular path of radius R and circumference C about the center O' of the nominal pixel position 400. Four different positions of the pixel about this circular path are indicated in phantom at 41 through 44. In this case, the radius R is equal to one half the diagonal pitch Pd.

The above projection systems, while employing only one display device, may be used to produce monochrome, multicolor or full color displays, in any known manner. For example, full color video displays can be produced either by employing a display device whose matrix is made up of triads of individually addressable red, blue and green pixels, and addressing all of these pixels simultaneously, or by employing a display device whose matrix is made of pixels undifferentiated as to color, and by addressing the matrix or portions of the matrix sequentially with the red, blue and green video signals, and illuminating the matrix with the appropriate color during such addressing. One example of such a "single panel" sequential system is described and claimed in copending U.S. patent application Ser. No. 927,782, filed 920810 (Attorney's Docket No. PHA 21,648A), and assigned to the present assignee.

Figure 5:
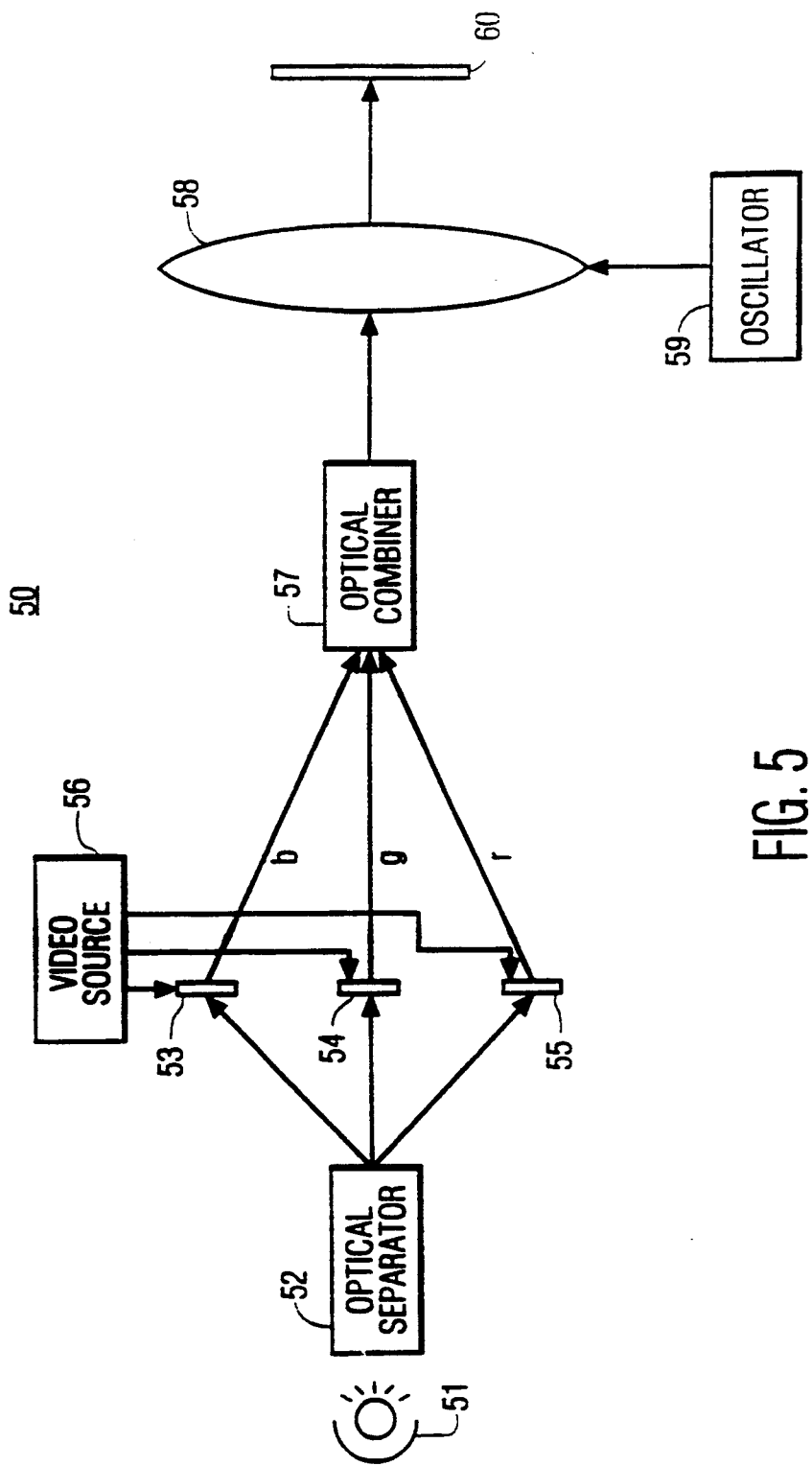
FIG. 5 is a schematic diagram of one embodiment of a color projection display system of the invention employing three display devices, and an oscillator for the projection lens.

Alternatively, a full color system may employ three different display devices, each dedicated to one of the primary colors red, blue and green, in the known manner. One such system 50 is shown schematically in FIG. 5, wherein white light source 51 is split by optical separator 52 into red, blue and green illumination beams, and directed onto display devices 53, 54 and 55, operating in the transmissive mode, for example, LCD devices. The beams are separately modulated in accordance with the red, blue and green video signals from video source 56, and then recombined by optical combiner 57, and projected by projection lens 58 onto screen 60. In accordance with the invention, the pixel images on the screen oscillate by virtue of an oscillation imparted to lens 58 by oscillator 59.

Another full color projection system suitable for use with the present invention utilizes three DMDs, each illuminated by a separate prism illuminator. Such a system is described and claimed in copending U.S. patent application Ser. No. 991,216, filed Dec. 16, 1992 (Attorney's Docket No. PHA 21,770), and assigned to the present assignee. According to the present invention, oscillation of the full color image of such a system could be achieved by oscillating one prism of each prism illuminator, for example, in the manner described above with reference to FIG. 1.

Figure 6:
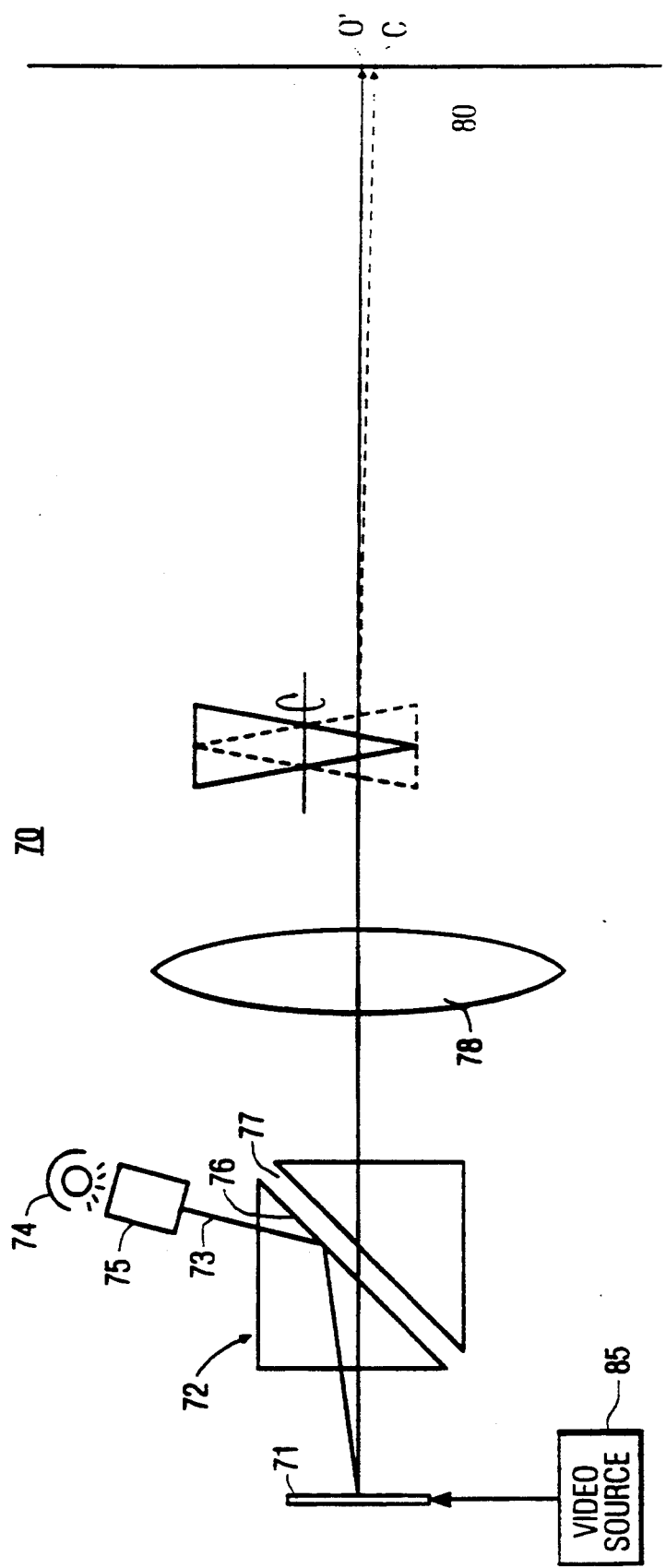
FIG. 6 is a schematic diagram of yet another embodiment of a projection system of the invention.

FIG. 6 illustrates another embodiment 70 of the projection system of the invention, in which the display device is an LCD operating in the reflective mode.

Such a device is described in U.S. Pat. No. 4,969,730, issued to A. H. J. van den Brandt. In FIG. 6, LCD 71 is illuminated by prism illuminator 72, which directs a linearly polarized illumination beam 73 from source 74, beam-forming optics 75 and polarizer 79, via total internal reflection to LCD 71.

LCD 71 incorporates a liquid crystalline material confined between a front transmissive wall and a rear wall having a reflective surface, the material exhibiting a change in transmission characteristics upon application of an applied voltage. A matrix array of pixels is defined by separately addressable pixel electrodes on one of the walls. Preferably, the rear wall is fabricated from a single piece of silicon, enabling the integration of the LCD device with associated addressing circuity.

The beam is reflected back by LCD 71, through air gap 77, analyzer 81 and projection lens 78, to projection screen 80. Inserted into the optical path between analyzer 81 and projection lens 78 is a wedge wheel 82, oriented to have its optical surfaces in to the optical path, and to be rotatable about an axis displaced from the optical path.

Upon rotation of wedge wheel 82, this arrangement causes the individual pixel images at the screen 80 to follow a path approximating a circle of diameter D, D being the distance between the position $M_1$, corresponding to the minimum, and position $M_2$, corresponding to the maximum wedge thickness of the wedge wheel encountered by the beam.

The simplest form of oscillation to achieve would of course be sinusoidal displacement. It may be desirable, however, to use other forms, such as square wave or triangular wave displacement. A square wave may be useful, for example, where it is desired to "paint" pixels at a fixed location, while a triangular wave may be useful where it is desired to distribute the light evenly over the displacement distance.

When pixels are displaced, it may be advantageous to turn off the illumination for some portion of the displacement cycle. If the objective is to "paint" pixels at two distinct locations using square wave motion, the lamp(s) could be turned off during movement between the two extreme locations. If the objective is to distribute light evenly using triangular wave motion, the lamp(s) could be turned off during transition periods in which the motion is reversing direction.

When using a square wave or an approximation thereof, or any other displacement scheme or combination of displacement and varying and/or intermittent illumination in which pixel positions can be differentiated, it is possible to increase the resolution of the display by addressing the matrix at least two times during each oscillatory cycle, making possible changing the pixel information at different locations along the oscillation path. For example, when painting pixels at the two extremes of a unidirectional or elliptical oscillation path, different pixel information may be displayed at each extreme. Thus, one extreme may represent alternate video samples, and the other extreme may represent video samples in between the samples displayed at the first extreme, providing up to two times more resolution when compared to a system in which the pixels are addressed only once during each oscillation or are not oscillated.

The invention has been described in terms of a limited number of embodiments. Other embodiments and variations of embodiments will become apparent to those skilled in the art from reading this description, and all such embodiments and variations are intended to be encompassed within the scope of the appended claims.

What is claimed is:

1. A projection system having at least one illuminating beam of light and comprising:
    (a) at least one display device located in the path of the beam and having a row and column matrix of individual picture display elements capable of displaying picture information by modulating the beam in response to a display signal; and
    (b) means for focusing the modulated beam into a display image comprised of a matrix of individual pixels, and for projecting the image onto a display screen; the projection system including means for causing the projected image to oscillate in the plane of the image; the display device being illuminated by a prism illuminator comprising a pair of prisms separated by an air gap, and the means for causing the projected image to oscillate comprising means for imparting an oscillatory motion to at least one of the prisms, to result in an oscillatory change in the width of the air gap, whereby the perception of individual pixels is reduced.

2. The projection system of claim 1 in which the oscillation of the projected image is limited to a direction along either the rows or the columns of the matrix.

3. The projection system of claim 1 in which the amplitude of the oscillation of the projected image is no greater than approximately one half the average pitch of the pixels, where the pitch is the distance between the centers of adjacent pixels.

4. The projection system of claim 3 in which the direction of oscillation is approximately diagonal with respect to the row and column directions.

5. The projection system of claim 1 which includes means for addressing the matrix with a display signal.

6. The projection system of claim 5 in which the matrix is addressed at least two times during each oscillatory cycle.

7. The projection system of claim 1 in which the signal is a frame-by-frame video signal, and the frequency of oscillation is at least equal to the frame frequency.

* * * * *